United States Patent
Lee

(10) Patent No.: US 8,640,564 B2
(45) Date of Patent: Feb. 4, 2014

(54) CIRCULATION ELEMENT FOR BALL SCREW

(75) Inventor: Yu-Shan Lee, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 802 days.

(21) Appl. No.: 12/648,302

(22) Filed: Dec. 29, 2009

(65) Prior Publication Data

US 2011/0154926 A1    Jun. 30, 2011

(51) Int. Cl.
 *F16H 55/02* (2006.01)
(52) U.S. Cl.
 USPC ..................... 74/424.87; 74/424.82
(58) Field of Classification Search
 USPC ............... 74/424.82, 424.86, 424.87, 424.81, 74/424.83, 424.84
 See application file for complete search history.

(56) References Cited

U.S. PATENT DOCUMENTS

| | | | | |
|---|---|---|---|---|
| 4,186,621 A * | 2/1980 | Brusasco | ................... | 74/424.83 |
| 6,237,434 B1 * | 5/2001 | Brown et al. | ............... | 74/424.82 |
| 6,561,053 B2 * | 5/2003 | Greubel | ................... | 74/424.87 |
| 7,350,434 B2 * | 4/2008 | Nishimura et al. | ........ | 74/424.86 |
| 7,523,681 B2 * | 4/2009 | Pan et al. | ................... | 74/424.82 |
| 7,523,682 B2 * | 4/2009 | Liao et al. | .................. | 74/424.87 |
| 7,694,600 B2 * | 4/2010 | Osterlaenger et al. | ..... | 74/424.82 |
| 7,845,251 B2 * | 12/2010 | Wu | ............................ | 74/424.86 |
| 7,870,806 B2 * | 1/2011 | Nishimura et al. | ........ | 74/424.82 |
| 7,908,938 B2 * | 3/2011 | Chen | .......................... | 74/424.82 |
| 7,934,438 B2 * | 5/2011 | Chen et al. | ................... | 74/89.44 |
| 7,992,461 B2 * | 8/2011 | Lin et al. | .................... | 74/424.86 |
| 8,033,195 B2 * | 10/2011 | Michioka et al. | .......... | 74/424.82 |
| 8,146,453 B2 * | 4/2012 | Uesugi et al. | .............. | 74/424.82 |
| 8,205,519 B2 * | 6/2012 | Osterlaenger et al. | ..... | 74/424.87 |
| 2003/0172759 A1 * | 9/2003 | Hayashi | ..................... | 74/424.86 |
| 2005/0252320 A1 * | 11/2005 | Hartig et al. | ................. | 74/89.23 |
| 2006/0027038 A1 * | 2/2006 | Ohkubo et al. | ............ | 74/424.86 |
| 2007/0028712 A1 * | 2/2007 | Teramachi et al. | ......... | 74/424.82 |
| 2007/0295133 A1 * | 12/2007 | Chen | .......................... | 74/424.87 |
| 2008/0053260 A1 * | 3/2008 | Liao et al. | ................... | 74/424.87 |
| 2008/0134822 A1 * | 6/2008 | Pan et al. | .................... | 74/424.87 |
| 2008/0245170 A1 * | 10/2008 | Teramachi et al. | ......... | 74/424.86 |
| 2008/0302197 A1 * | 12/2008 | Liu et al. | .................... | 74/424.82 |
| 2009/0013811 A1 * | 1/2009 | Hsu | .............................. | 74/424.87 |
| 2009/0070078 A1 * | 3/2009 | Miyahara et al. | ................. | 703/1 |

* cited by examiner

*Primary Examiner* — Justin Krause
*Assistant Examiner* — Gregory Prather
(74) *Attorney, Agent, or Firm* — Chun-Ming Shih

(57) ABSTRACT

This invention is revises the cap nut which the custom knows to suppose it to install trough's outline, will cause to install the dadoing to lead (lead angle to be small) lowly or on two above trundle ditch cap nut will not have the broken tooth's question, when will process should install the trough, only need use the face cutter then to process the forming, will reduce the production cost; And return circuit of this invention all establishes in the backflow part, therefore may promote and the cap nut supposes the backflow hole and the load way grade of fit, causes to roll the moving parts movement to be smoother, and reduces the noise production.

5 Claims, 6 Drawing Sheets

CIRCULATION ELEMENT FOR BALL SCREW

BACKGROUND OF THE INVENTION

1. Field of the Invention

The present invention provides circulation elements for a linear transmission element. In particular, the present invention relates to an arrangement of circulation elements and cap nuts for ball screw.

2. Descriptions of the Related Art

FIG. 1 illustrates an arrangement of the circulation elements and the cap nut of the ball screw of the prior art. The circulation elements 2 are mounted on a cap nut 1 having a short lead (i.e. having a small lead angle) or more than two rolling trenches 11. With the two recited limitations, the thickness D between the rolling trenches 11 of the cap nut 1 would be thinner. A mounting trough should be formed on the cap nut 1 for mounting the circulation elements 2, and the outline of the mounting trough should match the outline of the circulation elements 2. The general outline of the circulation elements 2 is a rectangle as shown in figure. The mounting trough, having the same outline as the circulation elements 2, can not be formed on the cap nut 1, or there would be a break X on the rolling trench 11 as shown in figure. As a result, the rolling element can not move in the rolling trench 11, and the circulation elements 2 can not be mounted on the cap nut 1, which has a short lead (i.e. having a small angle) or more than two rolling trenches.

In order to improve the aforesaid conventional problems coming from the cap nut having a short lead (i.e. having a small lead angle) or more than two rolling trenches, a publication cap nut having a circulation hole, being formed through two ends of the cap nut along an axial direction. The two ends of the circulation hole are formed with two circulation elements, and the two ends of a circulation passage formed by the circulation elements connect helical paths of the cap nut and the screw and the circulation hole. The thickness between the helical paths is thinner due to the small lead of the helical path or due to the plural helical paths. In order to mount the circulation elements on the cap nut, a part of the circulation passages of the circulation elements is designed on the cap nut. However, the circulation passages formed on the cap nut is curved and has a curved surface, and the processing would be difficult, the process time would be longer, and the manufacturing cost would be increased thereby. Even if the process is completed, the circulation passages of the circulation elements may not be matched. The circulation passages are curved, and the rolling element moves therein would impact the surfaces of the circulation passages. As the circulation passages are partially made of metal, the impact would be noisier. The technology disclosed in this Japan publication patent cannot solve the problems coming from the cap nut having a short lead (i.e. having a small lead angle) or more than two rolling trenches.

SUMMARY OF THE INVENTION

According to the aforesaid problems of the conventional technology, the inventor researches and improves to provide the invention, which certainly achieves the following invention objectives.

The primary objective of the present invention is to open up and develop circulation elements used for a ball screw having a short lead (i.e. having a small lead angle) or more than two rolling trenches, and to save the manufacturing cost and decrease operating noise of the ball screw.

To achieve the recited objectives, the present invention is a ball screw having circulation elements, comprising:

a screw, being formed with a spiral rolling trough at an outer edge thereof;

a cap nut, being formed with a through hole for the screw to insert through, an inner edge of the through hole formed with a rolling trench relative to the rolling trough, the rolling trench and the rolling trough forming a loading path, the loading path having a lead angle, and the cap nut having a circulation hole, being formed through two ends of the cap nut along an axial direction, and a mounting trough, being formed at two ends of the circulation hole and connecting with the rolling trench;

two circulation elements, being formed at the mounting trough, each of the circulation elements being formed with a circulation passage, two ends of the circulation passage connecting to the loading path and the circulation hole to form a circulation path;

a plurality of rolling elements, being formed at the circulation path;

wherein the mounting trough is formed with a first leaning surface, a second leaning surface, and an inclined plane, the inclined plane is approximately parallel to a lead angle of the loading path, each of the circulation elements is formed with a first resisting surface, a second resisting surface, and a mating surface, the first resisting surface leans on the first leaning surface, the second resisting surface leans on the second leaning surface, and the mating surface is disposed relatively to the inclined plane.

The mating surface and the inclined plane do not contact with each other.

The inclined plane is located between the first leaning surface and the second leaning surface.

The mating surface is formed between the first resisting surface and the second resisting surface.

The normal direction of the first leaning surface and the second leaning surface is parallel to the axial direction of the screw.

The normal direction of the first resisting surface and the second resisting surface is parallel to the axial direction of the screw.

The section of the inclined plane is U shaped.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The drawings disclose an illustrative embodiment of the present invention, which serves to exemplify the various advantages and objects hereof, and are as follows.

DESCRIPTION OF THE PREFERRED EMBODIMENT

Figure 1:
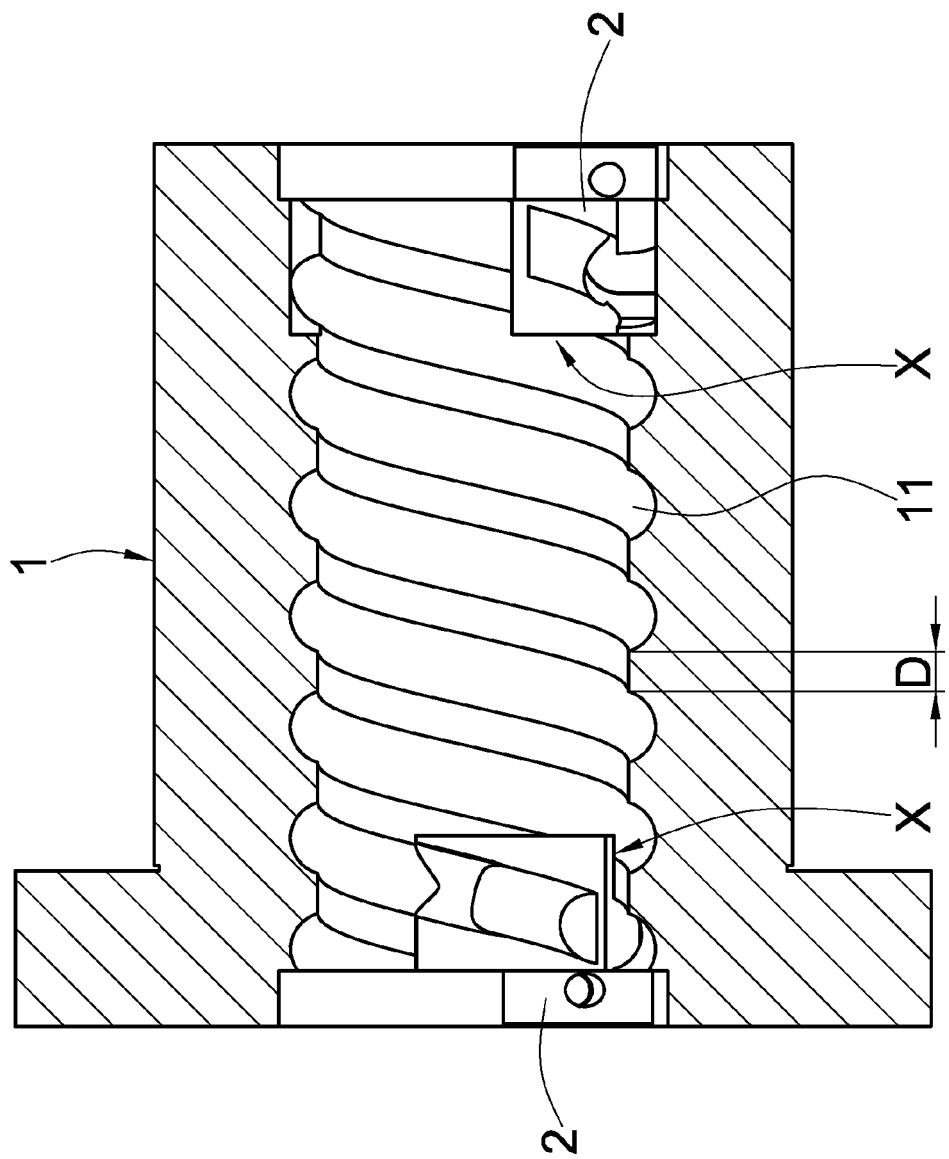
FIG. 1 is an assembly drawing of a cap nut and circulation elements of the prior art.
Figure 2:
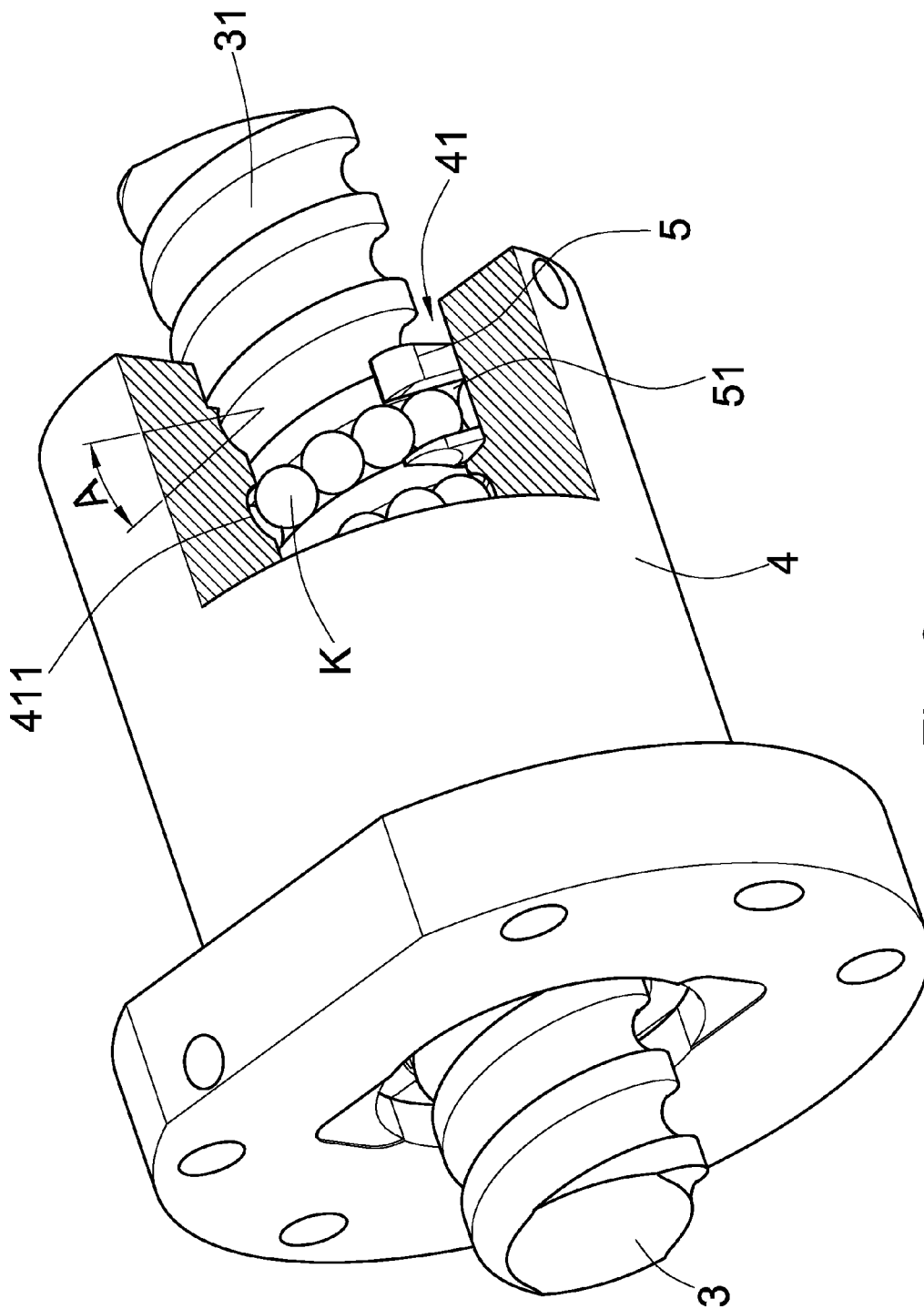
FIG. 2 is a partial cross sectional view of the cap nut of the ball screw of the present invention.
Figure 3:
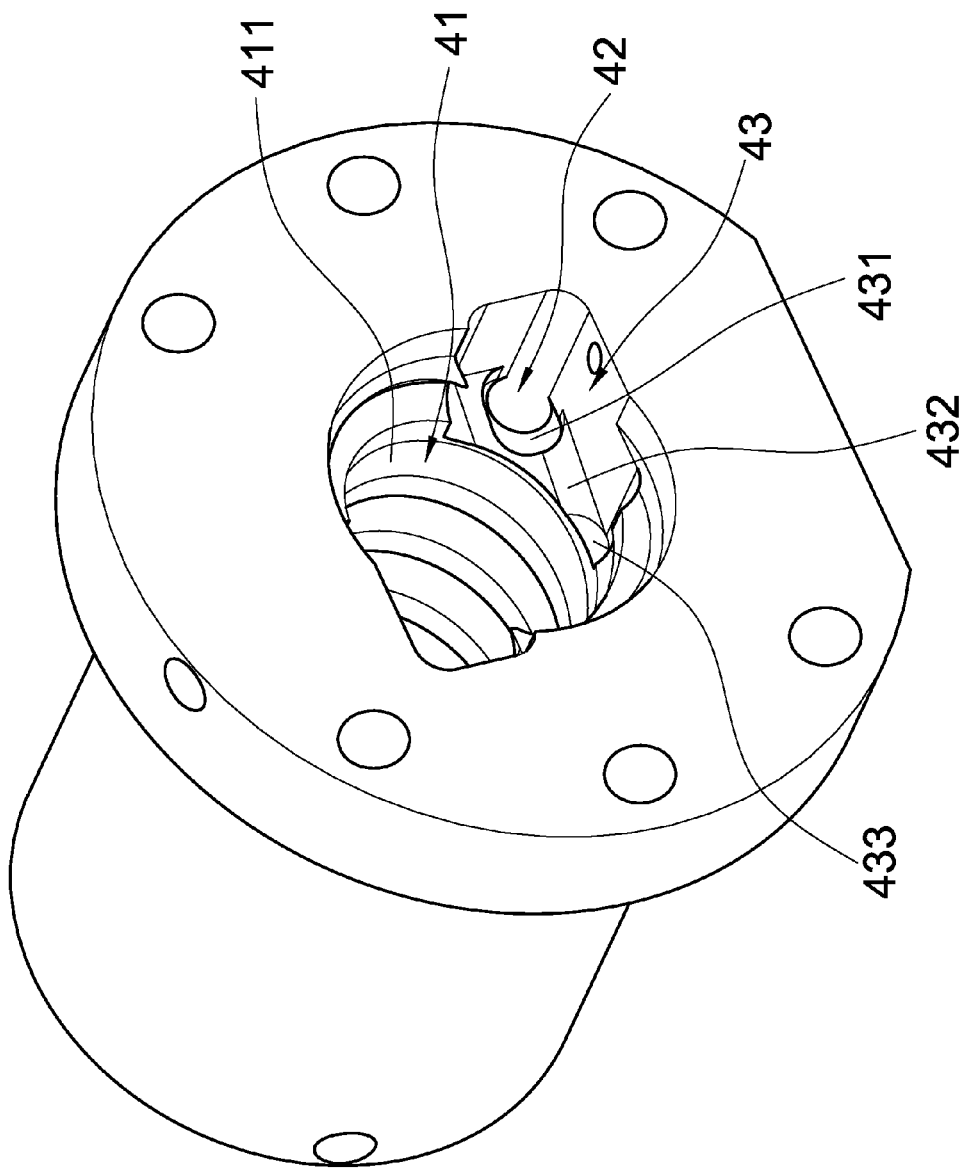
FIG. 3 is a perspective view of the cap nut of the present invention.
Figure 5:
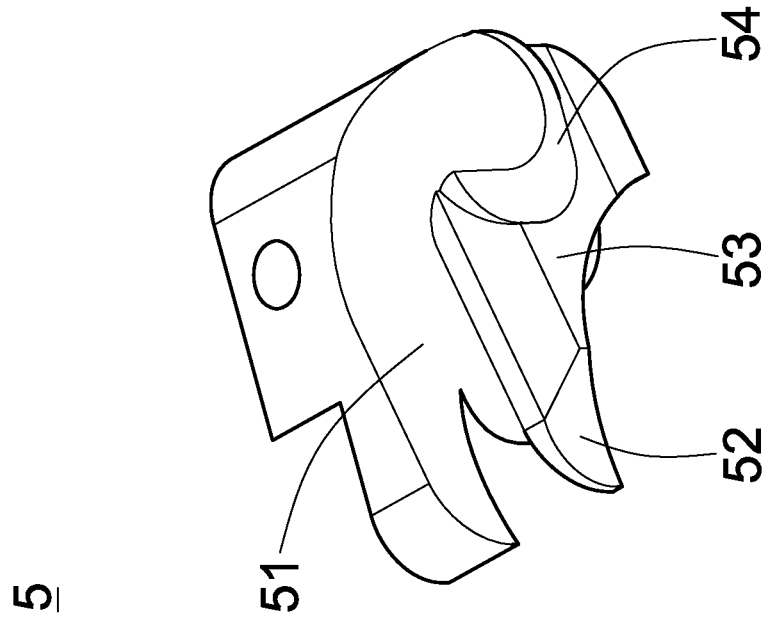
FIG. 5 is a bottom perspective view of the circulation elements of the present invention.
Figure 4:
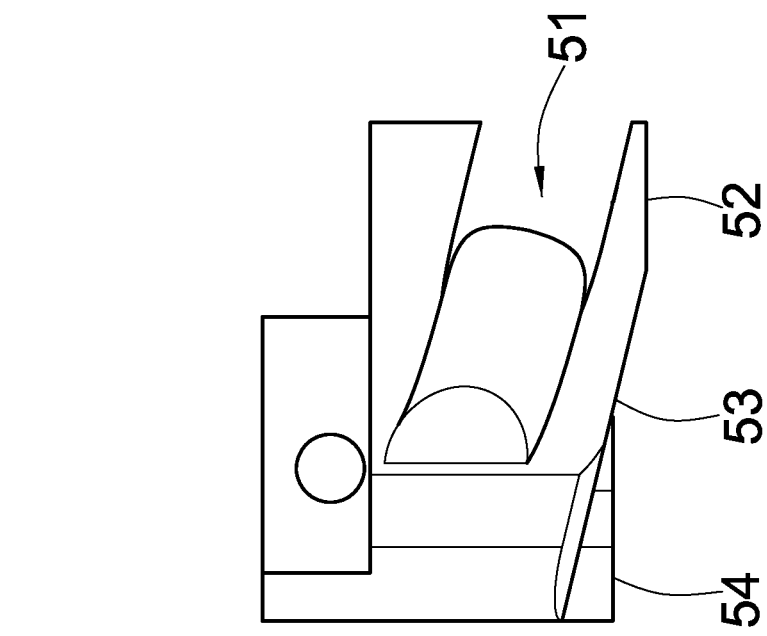
FIG. 4 is a top view of the circulation elements of the present invention.
Figure 6:
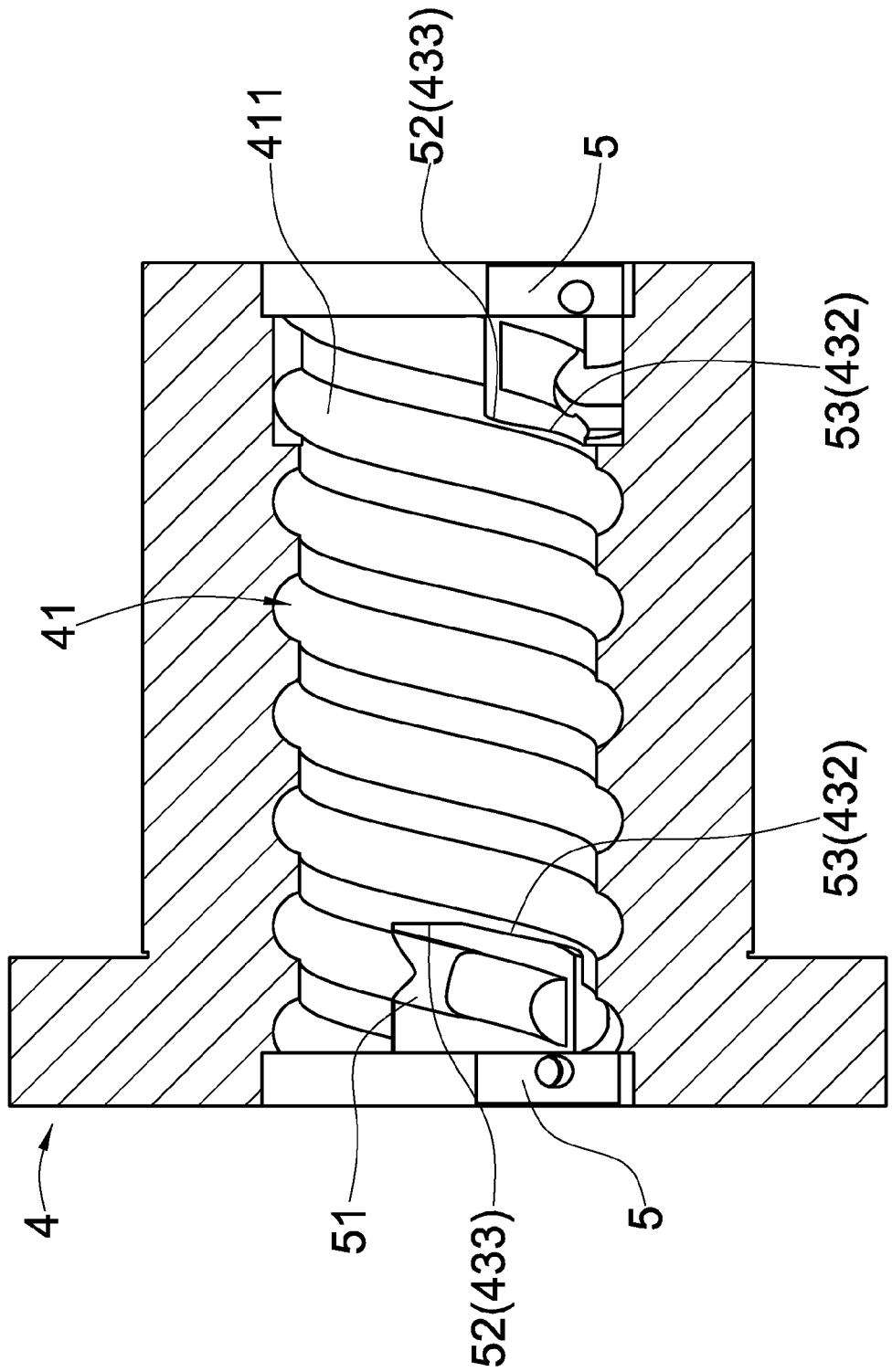
FIG. 6 is an assembly drawing of the circulation elements mounted on the cap nut.
Figure 7:
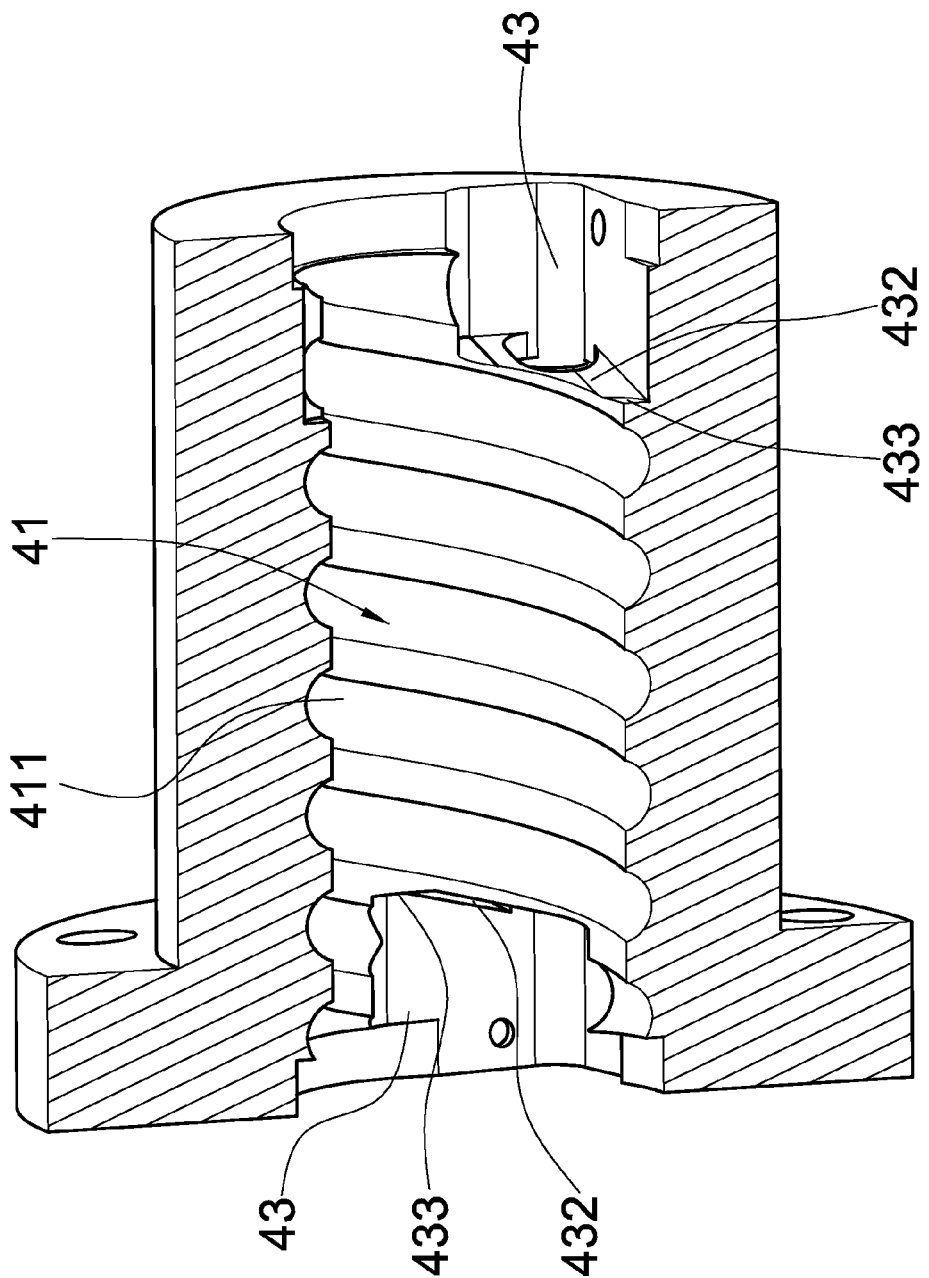
FIG. 7 is a half section perspective view of the cap nut of the present invention for illustrating the second leaning surface of the mounting trough specifically.

Referring to FIG. 2 to FIG. 7, the present invention is a ball screw having circulation elements, comprising:

a crew 3, being formed with a spiral rolling trough 31 at an outer edge thereof;

a cap nut 4, being formed with a through hole 41 for the screw 3 to insert through, an inner edge of the through hole 41 formed with a rolling trench 411 relative to the rolling trough 31, the rolling trench 411 and the rolling trough 31 forming a loading path, the loading path having a lead angle A, and the cap nut 4 having a circulation hole 42, being formed through two ends of the cap nut along an axial direction, and a mounting trough 43, being formed at two ends of the circulation hole 42 and connecting with the rolling trench 411;

two circulation elements 5, being formed at the mounting trough 43, each the circulation elements 5 being formed with a circulation passage 51, two ends of the circulation passage 51 connecting to the loading path and the circulation hole 42 to form a circulation path;

a plurality of rolling elements K, being formed at the circulation path;

wherein the mounting trough 43 is formed with a first leaning surface 431, a second leaning surface 433, and an inclined plane 432, the inclined plane 432 is approximately parallel to a lead angle A of the loading path. Each of the circulation elements 5 is formed with a first resisting surface 52, a second resisting surface 54, and a mating surface 53. The first resisting surface 52 leans on the first leaning surface 43, the second resisting surface 54 leans on the second leaning surface 433, and the mating surface 53 is located relatively to the inclined plane 432.

However, because the inclined plane 432 is approximately parallel to the lead angle of the loading path, the good precision of the processing on the inclined plane 432 would be hard obtained. Therefore, the first resisting surface 52 leans on the first leaning surface 431 and the second resisting surface 54 leans on the second leaning surface 433 for positioning the circulation elements 5 in the present invention. The normal direction of the first leaning surface 431 and the second leaning surface 433 is parallel to the axial direction of the screw 3, and the processing would be easier and would have a better precision. The assembly precision of the circulation elements 5 would be improved. The mating surface 53 and the inclined plane 432 do not contact with each other. The inclined plane 432 is approximately parallel to a lead angle of the loading path. Thereby, there would not be any broken thread at the mounting trough 43 of the cap nut 4, and the rigidness of the rolling trench 411 would not be affected. Because there is a certain thickness between the rolling trenches 411, the circulation elements 5 would be positioned in the mounting trough firmly.

In order to clarify the features of the present invention, the advantages and the practical utilities of the present invention comparing with the prior art are illustrated as following.

The present invention amends the outline of the mounting trough formed on the conventional cap nut, and the cap nut having a short lead (i.e. having a small lead angle) or more than two rolling trenches will not have the broken tooth's question. When processing the mounting trough of the present invention, an end mill would be only used. Any special process is not required, and the manufacturing cost would be reduced. The circulation passages of present invention are disposed on the circulation elements, and the mating precision of the circulation hole and the loading path would be improved. Therefore, the rolling element may operate much smoother and may make less noise.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A ball screw having circulation elements, comprising:
   a screw, being formed with a spiral rolling trough at an outer edge thereof;
   a cap nut, being formed with a through hole for the screw to insert through, an inner edge of the through hole formed with a rolling trench relative to the rolling trough, the rolling trench and the rolling trough forming a loading path, the loading path having a lead angle, and the cap nut having a circulation hole, being formed through two ends of the cap nut along an axial direction, and two mounting troughs, being respectively formed at two ends of the circulation hole and connecting with the rolling trench;
   two circulation elements, being formed at the mounting troughs, respectively, each of the circulation elements being formed with a circulation passage, two ends of the circulation passage connecting to the loading path and the circulation hole to form a circulation path; and
   a plurality of rolling elements, being formed at the circulation path;
   wherein each of the mounting troughs is formed with an inclined plane, the inclined plane is approximately parallel to a lead angle of the loading path, each of the circulation elements is formed with a mating surface, the mating surface of each circulation element is formed relatively to the inclined plane of the corresponding mounting through, and
   wherein each of the mounting troughs is further formed with a first leaning surface and a second leaning surface respectively extending from two sides of the inclined plane, and a normal direction of the first leaning surface and the second leaning surface is parallel to the axial direction of the screw.

2. The ball screw comprising the circulation elements of claim 1, wherein each of the circulation elements is further formed with a first resisting surface and a second resisting surface.

3. The ball screw comprising the circulation elements of claim 2, wherein the first resisting surface of the circulation element leans on the first leaning surface of the corresponding mounting through and the second resisting surface of the circulation element leans on the second leaning surface of the corresponding mounting through.

4. The ball screw comprising the circulation elements of claim 2, wherein the first resisting surface and the second resisting surface respectively extend from two sides of the mating surface in each circulation element.

5. The ball screw comprising the circulation elements of claim 1, wherein a section of the inclined plane is U shaped.

* * * * *